United States Patent
Mehring et al.

(10) Patent No.: US 8,402,946 B2
(45) Date of Patent: Mar. 26, 2013

(54) FUEL DISTRIBUTOR

(75) Inventors: Markus Mehring, Lichtenau (DE);
Michael Hoischen, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 395 days.

(21) Appl. No.: 12/793,258

(22) Filed: Jun. 3, 2010

(65) Prior Publication Data
US 2011/0094477 A1 Apr. 28, 2011

(51) Int. Cl.
*F02M 69/46* (2006.01)
*F02M 55/02* (2006.01)

(52) U.S. Cl. ............ 123/456; 123/468; 285/133.3; 285/133.6; 285/288.1

(58) Field of Classification Search ............... 123/456, 123/468, 469; 285/133.3, 133.5, 133.6, 328, 285/330, 332.2, 334.4, 197, 288.1
See application file for complete search history.

(56) References Cited

U.S. PATENT DOCUMENTS

| | | | | |
|---|---|---|---|---|
| 4,570,600 A | * | 2/1986 | Atkins et al. | 123/468 |
| 4,899,712 A | * | 2/1990 | De Bruyn et al. | 123/468 |
| 5,040,512 A | * | 8/1991 | Twilton | 123/470 |
| 5,072,710 A | * | 12/1991 | Washizu | 123/470 |
| 5,074,269 A | * | 12/1991 | Herbon et al. | 123/470 |
| 5,775,302 A | | 7/1998 | Guido et al. | |
| 6,604,510 B2 | * | 8/2003 | Scollard et al. | 123/470 |
| 6,609,502 B1 | * | 8/2003 | Frank | 123/469 |
| 6,651,627 B2 | * | 11/2003 | Zdroik et al. | 123/456 |
| 6,889,660 B2 | * | 5/2005 | Usui et al. | 123/456 |
| 7,114,489 B2 | * | 10/2006 | Wenke et al. | 123/456 |
| 7,213,577 B2 | * | 5/2007 | Hummel et al. | 123/469 |
| 7,305,969 B2 | * | 12/2007 | Ricco et al. | 123/456 |
| 7,377,263 B2 | * | 5/2008 | Muench et al. | 123/468 |
| 7,516,735 B1 | | 4/2009 | Doherty et al. | |
| 7,523,741 B2 | * | 4/2009 | Kochanowski et al. | 123/456 |
| 7,699,041 B2 | * | 4/2010 | Colletti et al. | 123/456 |
| 7,802,558 B2 | * | 9/2010 | Panchal | 123/456 |
| 7,810,471 B2 | * | 10/2010 | Zdroik | 123/456 |
| 7,900,603 B2 | * | 3/2011 | Hasegawa et al. | 123/456 |
| 8,196,967 B2 | * | 6/2012 | Seifert et al. | 285/14 |
| 2001/0010216 A1 | * | 8/2001 | Usui et al. | 123/456 |
| 2003/0042735 A1 | * | 3/2003 | Jung et al. | 285/133.11 |
| 2006/0163873 A1 | * | 7/2006 | Langhuber et al. | 285/386 |
| 2007/0006848 A1 | * | 1/2007 | Ricco et al. | 123/456 |
| 2007/0006850 A1 | * | 1/2007 | Ricco et al. | 123/468 |
| 2008/0169364 A1 | | 7/2008 | Zdroik et al. | |

FOREIGN PATENT DOCUMENTS

| | | |
|---|---|---|
| AT | 412228 B | 11/2004 |
| DE | 3821827 A1 | 1/1989 |
| DE | 19607521 C1 | 4/1997 |
| DE | 19753054 A1 | 6/1998 |
| DE | 19744762 A1 | 10/1998 |
| DE | 102005003519 A1 | 8/2006 |
| EP | 0122848 A1 | 4/1984 |

(Continued)

*Primary Examiner* — Thomas Moulis
(74) *Attorney, Agent, or Firm* — Rader, Fishman & Grauer, PLLC

(57) ABSTRACT

A fuel distributor for supplying fuel to injection valves for internal combustion engines includes a hollow manifold having a plurality of branch bores disposed radially therethrough. A plurality of branch lines are operably connected with a manifold at the branch bores by adapters. The adapters have either a one-piece deep-drawn construction or a one-piece extruded construction, and include a mounting flange that conforms to the outer contour of the manifold and joins the adapter to the exterior of the manifold, and a neck portion that closely receives and securely mounts therein the end portions of the branch lines.

11 Claims, 2 Drawing Sheets

FOREIGN PATENT DOCUMENTS

| | | |
|---|---|---|
| EP | 0866221 A1 | 12/1997 |
| EP | 1304477 A2 | 8/2002 |
| JP | 9236064 A | 9/1997 |
| JP | 200721508 A | 2/2007 |
| WO | 2007033738 A2 | 3/2007 |

* cited by examiner

US 8,402,946 B2

FUEL DISTRIBUTOR

CLAIM OF PRIORITY

Applicants hereby claim the priority benefits under the provisions of 35 U.S.C. §119, basing said claim of priority on German Patent Application Serial No. 10 2009 051065.6, filed Oct. 28, 2009. In accordance with the provisions of 35 U.S.C. §119 and Rule 55(b), a certified copy of the above-listed German patent application will be filed before grant of a patent.

BACKGROUND OF THE INVENTION

The invention relates to a fuel distributor for supplying fuel to injection valves in an internal combustion engine.

The generation of pressure and the injection of fuel are not typically integrated or connected to one another in fuel distribution systems. Rather, a fuel pump generates pressure continuously. This pressure, which is built up independent of the injection sequence, is continuously or permanently available in the fuel distributor, which functions as an accumulator unit. In addition, the compressed fuel is accumulated in a manifold, and then distributed to the injectors via branch lines, or is otherwise made available to injection valves in a cylinder bank.

Prior art fuel distributors are known from DE 196 07 521 C1, DE 197 53 054 C2, and EP 0 866 221 B1.

DE 197 44 762 A1 describes an injection device for a diesel engine in which the fuel distributor comprises a drawn or rolled pipe. Connecting nipples are welded or soldered to this pipe. Insertion bores for receiving the connecting nipples are added to the fuel distributor. The connecting nipples are placed in the insertion bores prior to welding or soldering.

Moreover, disclosed in EP 0 122 848 is a method for producing a hydraulic connection for a hollow body. For this arrangement, a neck-shaped adapter branch is provided on the hollow body. A connecting line is placed on the adapter branch, and is then fixed in place by deforming the wall of the branch.

Connecting elements embodied as threaded bushings are disclosed in WO 2007/033738 A2 and DE 38 21 827 C2 for connecting branch lines to manifolds of fuel distributors. A sealing seat is produced by mechanical machining of the manifold. These threaded bushings are relatively expensive. In addition, the branch line must be provided with a clinch head or sealing nipple. The end of the branch line and the threaded bushing are generally connected via a union nut, resulting in additional costs. Moreover, assembling the branch line is more complex. In addition, there is also a risk of leaks.

Machining the manifold results in high manufacturing costs. In addition, meeting that the requirements for cleanliness in the fuel area has proved problematic, especially the requirement that none of the waste from machining remains in the manifold.

The connecting elements, either turned and/or milled parts, are also complex and relatively expensive to produce. Moreover, solid thick-walled connecting components combined with comparatively thin-walled manifolds are not an ideal combination for joining, especially for soldering.

SUMMARY OF THE INVENTION

An object of the present invention is to create a simple and cost-effective solution for connecting branch lines to a manifold of a fuel distributor, wherein requirements regarding tightness against fuel leaks and mechanical stresses are satisfied or fully met.

This object is attained in accordance with the present invention in a fuel distributor in accordance with the features of patent claim 1.

Advantageous embodiments and refinements of the present inventive fuel distributor are the subject-matter of dependent claims 2 through 8.

The present fuel distributor has a manifold for receiving pressurized fuel. A plurality of branch bores are added to the manifold. The branch bores extend in the radial direction of the manifold, penetrating the wall of the manifold, and open into the interior pressure chamber of the manifold. One branch line is connected to each branch bore via an adapter. In accordance with the present invention, adapters are embodied as either one-piece deep-drawn parts or one-piece extruded parts. Each adapter partly encloses the manifold radially. To this end, each adapter has a mounting flange that conforms to the outer contour of the manifold, and is used to join the adapter to the manifold. Moreover, the adapter has a neck that is oriented radially with respect to the manifold, and corresponds to an associated branch bore. An end portion segment of each branch line engages in the neck of the adapter, and is joined thereto. The adapter can be produced cost effectively with a minimum amount of material using a deep-drawn or extruded construction, especially a cold extruded construction.

The adapter provides a simple, cost-effective solution for connecting branch lines to the manifold of a fuel distributor. The connection is particularly suitable for manifolds that do not have a thick wall.

The neck on the adapter is produced using a pre-formed draft disposed radially to the surrounding surface. The end segment of a branch line is received and joined in the neck. A fuel-tight connection that is mechanically very strong is created between the manifold and branch line in this manner.

In one advantageous embodiment of the present invention, a stop is formed on the interior circumference of the neck for positioning the end segment of the branch line. The stop is in particular formed by displacing material in the neck, specifically using at least two projections, and preferably three projections, arranged offset to one another on the interior circumference. The projections formed by the displaced material in the neck act as an axial limit for the insertion depth of the branch line. In particular, they also act as a limit for the insertion depth of a soldering ring that is inserted into the neck to form a soldered joint between the neck and the branch line.

Another advantage of the neck construction is that an axial tolerance compensation is achieved by the sliding seat of the end segment of the branch line in the neck. This can compensate for fluctuations or variations in the pipe length of the branch lines.

For practical applications, it is particularly advantageous that soldering rings be inserted towards the stop in the axial direction of the neck from both sides. The adapter is joined to the manifold, and the branch line is joined in the neck of the adapter at the same time. It is not necessary to use soldering paste on the articles. In addition, this construction ensures that the fuel-tight soldered joint is very reliable.

In another embodiment of the present inventive fuel distributor, which is particularly advantageous in practical applications, the end segment of the branch line extends into the branch bore in the manifold and/or penetrates the branch bore. The end segment is then preferably fixed in the branch bore and joined, especially soldered, in the neck. The adapter assumes a supporting function for reducing changes in stiffness, and for improving resistance to vibration in the area in which the branch lines are joined to the manifold. This improves the overall construction of the fuel distributor and lengthens the service life of the same. This embodiment is particularly suitable for high and extremely high fuel pressures.

Moreover, at least one aperture may be provided in the adapter. The aperture is used for applying joining material, especially soldering material. In addition, the joint and the joining process may be visually inspected through the aperture. The aperture is preferably provided in the transition area between the mounting flange and the neck of the adapter.

Ideally, weld projections are provided on the joining surface of the mounting flange which pre-fix the adapter to the manifold. The welding projections pre-fix the adapter using resistance welding, and then the final fuel-tight seal is attained by soldering or welding, in particular laser welding.

A two-step mounting construction is also possible. In this case, the adapter is first joined to the manifold, for instance by soldering. The branch line is welded to the neck of the adapter, especially using inductive soldering or laser welding. This avoids undesired warping and loss of strength due to heat on the branch lines.

These and other advantages of the invention will be further understood and appreciated by those skilled in the art by reference to the following written specification, claims and appended drawings.

The invention shall be explained in greater detail in the following using an exemplary embodiment depicted in the drawings.

DETAILED DESCRIPTION OF THE PREFERRED EMBODIMENTS

Figure 1:
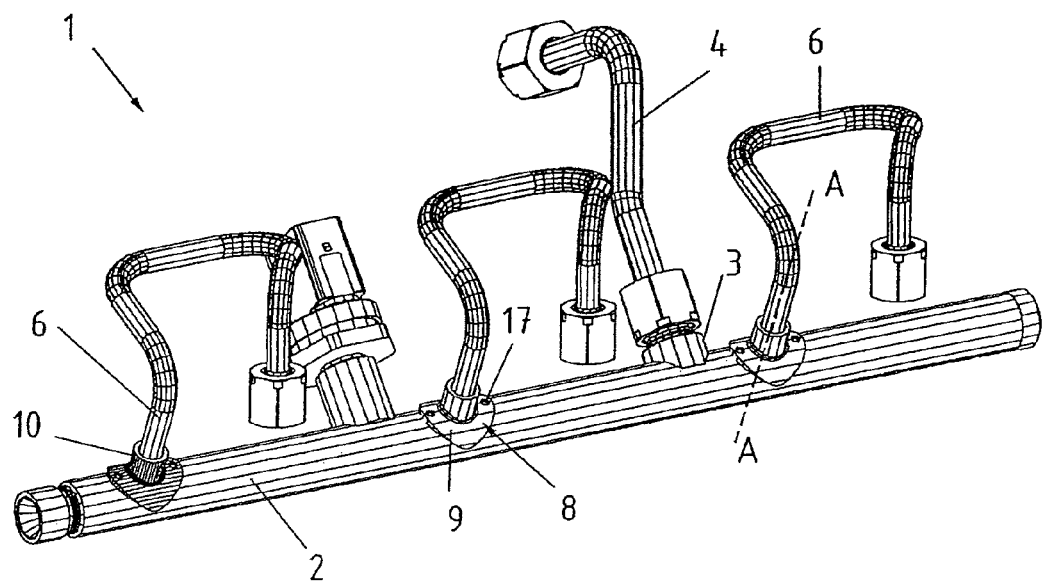
FIG. 1 is a perspective elevation of an inventive fuel distributor.
Figure 2:
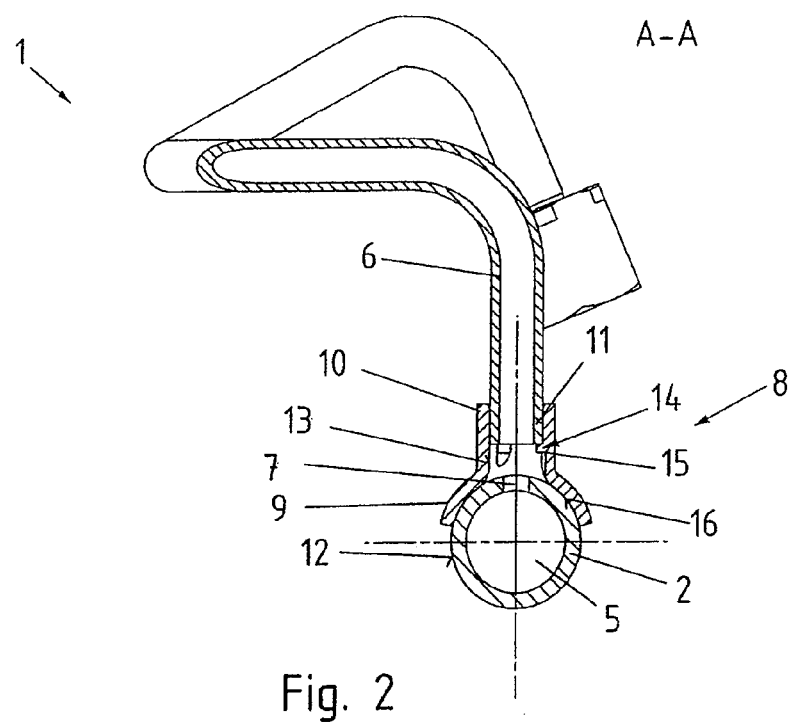
FIG. 2 is a vertical section through the depiction in FIG. 1 along the line A-A; and, FIG. 3 is a vertical section through another embodiment of an inventive fuel distributor.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
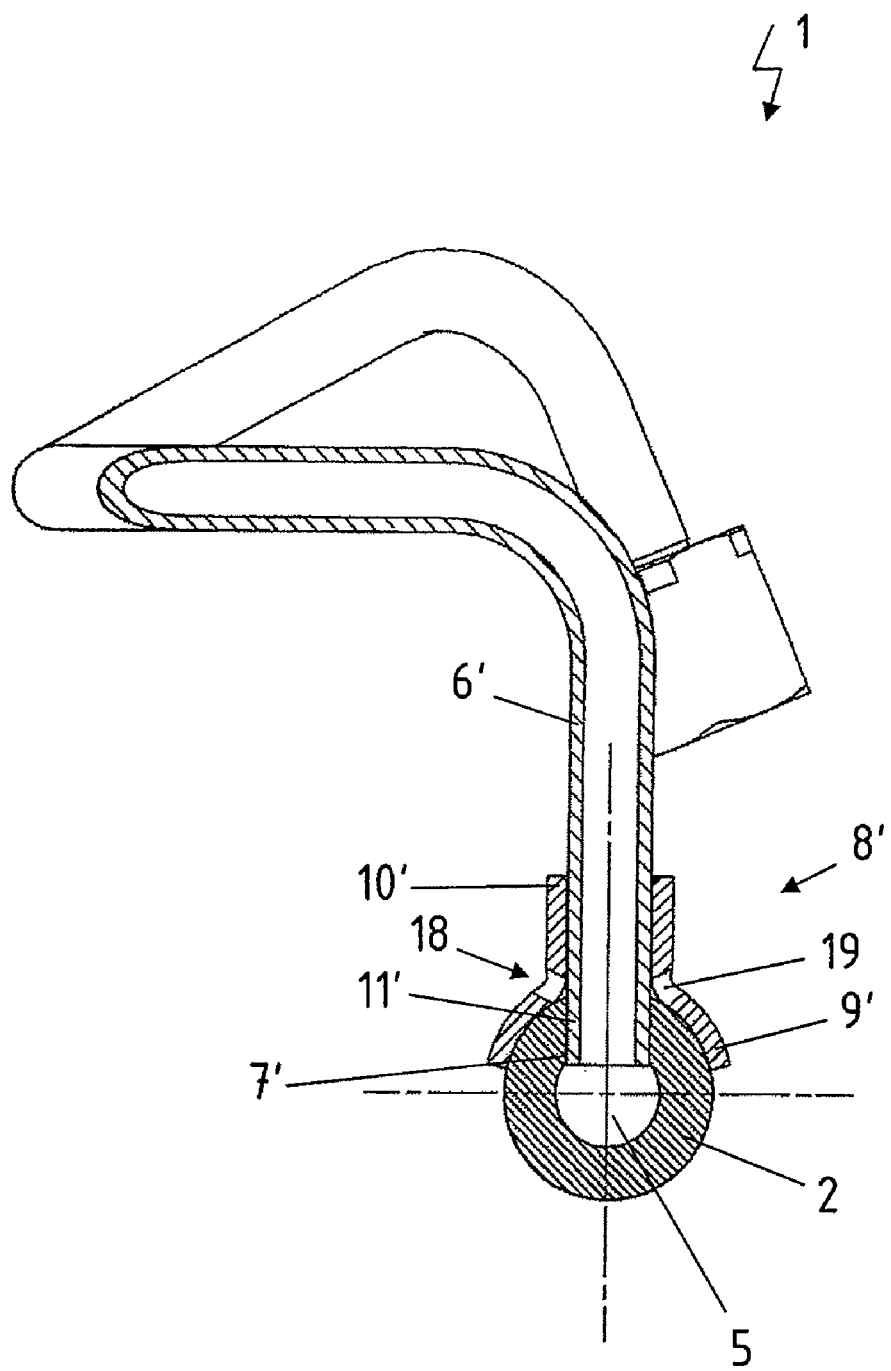

An inventive fuel distributor 1 embodying the present invention is explained using FIGS. 1 through 3. FIG. 2 depicts a first embodiment of a fuel distributor 1, and FIG. 3 depicts a second embodiment. Equivalent components and parts have the same labels or reference numerals.

The illustrated fuel distributor 1 is part of the accumulator injection system for an internal combustion engine, wherein fuel pressure generation and fuel injection are not integrated or connected to one another. Rather, a separate high-pressure pump generates fuel pressure continuously. This fuel pressure, which is independent of the injection sequence, is continuously or permanently available in the fuel distributor 1.

The illustrated fuel distributor 1 includes a hollow manifold 2 having a pump-side fuel inlet 3. Fuel is conducted through manifold 2 into a compression chamber 5 in the interior of the manifold 2 via a connecting line 4. The statically compressed fuel is accumulated in the manifold 2, and made available for distribution to the injectors in a cylinder bank (not shown) via a plurality of branch lines 6, 6'. To this end, radially oriented branch bores 7, 7' are provided in the manifold 2. The compression chamber 5 communicates with the branch lines 6, 6' via these radial branch bores 7, 7' to conduct fluid fuel.

Each of the branch lines 6, 6' is connected to the manifold 2 via an adapter 8, 8'. The illustrated adapter 8, 8' has either a one-piece deep-drawn construction or a one-piece extruded construction. Adapter 8, 8' has a mounting flange 9, 9' shaped to conform with the outer contour of the manifold 2. The adapter 8, 8' is joined to the manifold 2 via this mounting flange 9, 9'. A neck 10, 10' that is oriented radially to the manifold 2 is constructed as a deep-drawn or extruded draft on the adapter 8, 8'. A final end segment 11, 11' of the branch line 6, 6' engages and is joined to the neck 10, 10'.

The mounting flange 9, 9' is configured in a crown-like manner about the neck 10, 10' and covers a portion of the outer circumference 12 of the manifold 2.

In the embodiment of the fuel distributor 1 shown in FIG. 2, a stop 14 is provided on the inner circumference 13 of the neck 10. The stop 14 ensures the proper axial positioning of the end segment 11 in the neck 10. The stop 14 is produced by an inelastic displacement of material on the inner circumference 13 of the neck 10, specifically in the form of three inward projections 15 arranged offset to one another on the inner circumference 13. Stops 14 constitute the axial limit for the insertion depth of the branch line 6, and they are also a positioning aide for solder rings inserted into the neck 10. The neck 10 and branch line 6 can be joined by soldering these soldering rings. The soldering rings may be inserted from both sides of the neck 10 and positioned at the stop 14. The solder that melts when heated then fixes the end segment 11 of the branch line 6 in the neck 10, and it also simultaneously fixes the mounting flange 9 on the outer circumference 12 of the manifold 2.

In the illustrated example, weld projections 17 are provided on the joining surface 16 of the mounting flange 9. These projections 17 are used for pre-fixing or for joining the adapter 8 to the manifold 2 using resistance welding. Then, the mounting flange 9 and manifold 2 are joined by soldering or welding to create a fuel-tight material bond or seal.

A two-step mounting process is also possible. First, the adapter 8 is joined to the manifold 2, for instance using soldering. Then, the branch line 6 and adapter 8 are joined, preferably using inductive soldering or laser welding.

As FIG. 3 depicts, in an alternate embodiment of the fuel distributor 1, the end segment 11' of the branch line 6' is inserted into the branch bore 7', and projects into compression chamber 5. The end segment 11' is joined, preferably soldered, to the manifold 2 in the branch bore 7', and to the neck 10' of the adapter 8'. It can be seen that the end segment 11' terminates generally flush with the wall of the manifold 2 inside the manifold 2.

The adapter 8' provides an additional supporting function for reducing changes in stiffness, and for improving resistance to vibration at join locations, and thus the strength of fuel distributor 1.

Moreover, it can be seen that apertures 19 are provided in the transition area 18 between the mounting flange 9' portion of adapter 8' and the neck portion 10' of adapter 8'. Joining material, such as a solder material, may be applied through the apertures 19. In addition, the apertures 19 may be used to control and inspect the joining process, and the joint that is produced.

Otherwise, the process for joining adapter 8' and manifold 2 is similar to that described in the foregoing, so that the explanation will not be repeated.

The adapters 8, 8' that have been produced by deep-drawing or extrusion are cost-effective, both in terms of production and material usage. In addition, they are better than known proposals in terms of weight. The adapter 8, 8' can be produced either as a one-piece deep-drawn part, or as a one-piece extruded part, using a small amount of material and without mechanical machining. A simple and cost-effective solution for connecting branch lines 6 to the manifold 2 is thereby created. In particular, even those manifolds 2 that have a thinner wall than those of a conventional construction may be used in a fuel distributor 1.

In the foregoing description, it will be readily appreciated by those skilled in the art that modifications may be made to the invention without departing from the concepts disclosed herein. Such modifications are to be considered as included in the following claims, unless these claims by their language expressly state otherwise.

LEGEND

1—Fuel distributor
2—Manifold
3—Fuel inlet
4—Connecting line
5—Pressure chamber
6—Branch line
6'—Branch line
7—Branch bore
7'—Branch bore
8—Adapter
8'—Adapter
9—Mounting flange
9'—Mounting flange
10—Neck
10'—Neck
11—End segment of 6
11'—End segment of 6'
12—Outer circumference of 2
13—Outer circumference of 10
14—Stop
15—Projection
16—Join surface
17—Weld projection
18—Transition area
19—Aperture

The invention claimed is:

1. A fuel distributor for supplying fuel to injection valves for internal combustion engines, comprising:
a hollow manifold configured for receiving pressurized fuel therein;
a plurality of branch bores disposed generally radially through said manifold;
a plurality of branch lines having end portions thereof operably connected with said manifold at said branch bores;
a plurality of adapters connecting said branch lines with said manifold at said branch bores and having at least one of a one-piece deep-drawn construction and a one-piece extruded construction, and including a mounting flange portion that conforms to the outer contour of the manifold and joins the adapter to the exterior of said manifold, and a neck portion that is oriented radially to the manifold and closely receives and securely mounts therein said end portions of said branch lines; and
a stop disposed on an interior circumference area of said neck portion of at least one of said adapters for positioning said end portions of said branch lines.

2. A fuel distributor as set forth in claim 1, wherein:
said stop comprises an inelastically deformed portion of said neck portion.

3. A fuel distributor as set forth in claim 2, wherein:
said stop comprises at least two projections arranged offset to one another on the interior circumference area of said neck portion.

4. A fuel distributor as set forth in claim 1, wherein:
said end portions extend into an interior portion of said manifold.

5. A fuel distributor as set forth in claim 4, wherein:
said end portions are mounted in said branch bores.

6. A fuel distributor as set forth in claim 1, wherein:
said adapter includes an aperture disposed in a transition area thereof between said mounting flange portion and said neck portion.

7. A fuel distributor as set forth in claim 1, wherein:
said adapter is pre-attached to said manifold by a resistance weld projection; and including
a fuel tight seal disposed between said adapter and said manifold.

8. A fuel distributor for supplying fuel to injection valves for internal combustion engines, comprising:
a hollow manifold configured for receiving pressurized fuel therein;
a plurality of branch bores disposed generally radially through said manifold;
a plurality of branch lines having end portions thereof operably connected with said manifold at said branch bores;
a plurality of adapters connecting said branch lines with said manifold at said branch bores and having at least one of a one-piece deep-drawn construction and a one-piece extruded construction, and including a mounting flange portion that conforms to the outer contour of the manifold and joins the adapter to the exterior of said manifold, and a neck portion that is oriented radially to the manifold and closely receives and securely mounts therein said end portions of said branch lines, wherein said adapter includes an aperture disposed in a transition area thereof between said mounting flange portion and said neck portion.

9. A fuel distributor as set forth in claim 8, including:
a stop disposed on an interior circumference area of said neck portion of at least one of said adapters for positioning said end portions of said branch lines.

10. A fuel distributor for supplying fuel to injection valves for internal combustion engines, comprising:
a hollow manifold configured for receiving pressurized fuel therein;
a plurality of branch bores disposed generally radially through said manifold;
a plurality of branch lines having end portions thereof operably connected with said manifold at said branch bores;
a plurality of adapters connecting said branch lines with said manifold at said branch bores and having at least one of a one-piece deep-drawn construction and a one-piece extruded construction, and including a mounting flange portion that conforms to the outer contour of the manifold and joins the adapter to the exterior of said manifold, and a neck portion that is oriented radially to the manifold and closely receives and securely mounts therein said end portions of said branch lines, wherein said adapter is pre-attached to said manifold by a resistance weld projection; and a fuel tight seal disposed between said adapter and said manifold.

11. A fuel distributor as set forth in claim 10, including:

a stop disposed on an interior circumference area of said neck portion of at least one of said adapters for positioning said end portions of said branch lines.

* * * * *

UNITED STATES PATENT AND TRADEMARK OFFICE
CERTIFICATE OF CORRECTION

| | | |
|---|---|---|
| PATENT NO. | : 8,402,946 B2 | Page 1 of 1 |
| APPLICATION NO. | : 12/793258 | |
| DATED | : March 26, 2013 | |
| INVENTOR(S) | : Markus Mehring et al. | |

It is certified that error appears in the above-identified patent and that said Letters Patent is hereby corrected as shown below:

On the title page, insert item [30]:

--Foreign Application Priority Data

October 28, 2009   (DE)  10 2009 051065--

Signed and Sealed this
Fourth Day of June, 2013

Teresa Stanek Rea
*Acting Director of the United States Patent and Trademark Office*